United States Patent [19]
Denney et al.

[11] Patent Number: 5,495,562
[45] Date of Patent: Feb. 27, 1996

[54] ELECTRO-OPTICAL TARGET AND BACKGROUND SIMULATION

[75] Inventors: Dwight L. Denney, Rancho Cucamonga; Yung K. Yin, Placentia, both of Calif.

[73] Assignee: Hughes Missile Systems Company, Los Angeles, Calif.

[21] Appl. No.: 45,621

[22] Filed: Apr. 12, 1993

[51] Int. Cl.[6] .......................... G06T 15/10; G06T 15/50; G06T 15/70
[52] U.S. Cl. .......................... 395/121; 395/126; 395/127; 395/134; 395/152
[58] Field of Search ..................................... 395/119, 121, 395/126, 127, 134, 152; 434/21

[56] References Cited

U.S. PATENT DOCUMENTS

| | | | |
|---|---|---|---|
| 4,208,810 | 6/1980 | Rohner et al. | 395/127 X |
| 4,645,459 | 2/1987 | Graf et al. | 395/126 X |
| 4,807,158 | 2/1989 | Blanton et al. | 395/152 X |
| 4,819,192 | 4/1989 | Kuragano et al. | 395/121 |
| 4,928,250 | 5/1990 | Greenberg et al. | 395/126 |
| 5,224,860 | 7/1993 | Waldman et al. | 434/21 |
| 5,268,996 | 12/1993 | Steiner et al. | 395/126 |
| 5,299,298 | 3/1994 | Elmquist et al. | 395/121 |
| 5,343,558 | 8/1994 | Akeley | 395/126 |

*Primary Examiner*—Mark K. Zimmerman
*Attorney, Agent, or Firm*—Charles D. Brown; Randall M. Heald; Wanda K. Denson-Low

[57] ABSTRACT

A computer-based thermal scene simulation system and method for generating synthetic images to facilitate the design and test of missile-borne electro-optical seeker systems. A scene is comprised of objects and a background selected from available target and background database files. Stationary or mobile objects are modeled by combining small planar facets to cover their three dimensional surface. Each facet is associated in the database files with the thermal and optical properties of the surface that is modeled. The background is modeled on the interior surface of a pyramid defining the extent of the scene, with the floor of the pyramid representing the surface of the earth and the sides of the pyramid representing an above horizon image. The pyramid surface is then divided into triangular facets that represent portions of the surface. Each facet is assigned a uniform texture selected from the background database files comprising background materials. The simulation is designed to be used with missile six degree of freedom simulations, and generates images as seen by a missile seeker based on instantaneous seeker line of sight, seeker position, seeker orientation, object orientations and positions, and background. Seeker-to-object aspect angles and range closure rates are processed by an image generation procedure. A projected image is then convolved with the optical point spread function of the seeker to generate a radiance distribution on the focal plane of the seeker. Sampling of the focal plane radiance distribution is modeled and an output data stream from the seeker to a signal processor is generated.

14 Claims, 6 Drawing Sheets

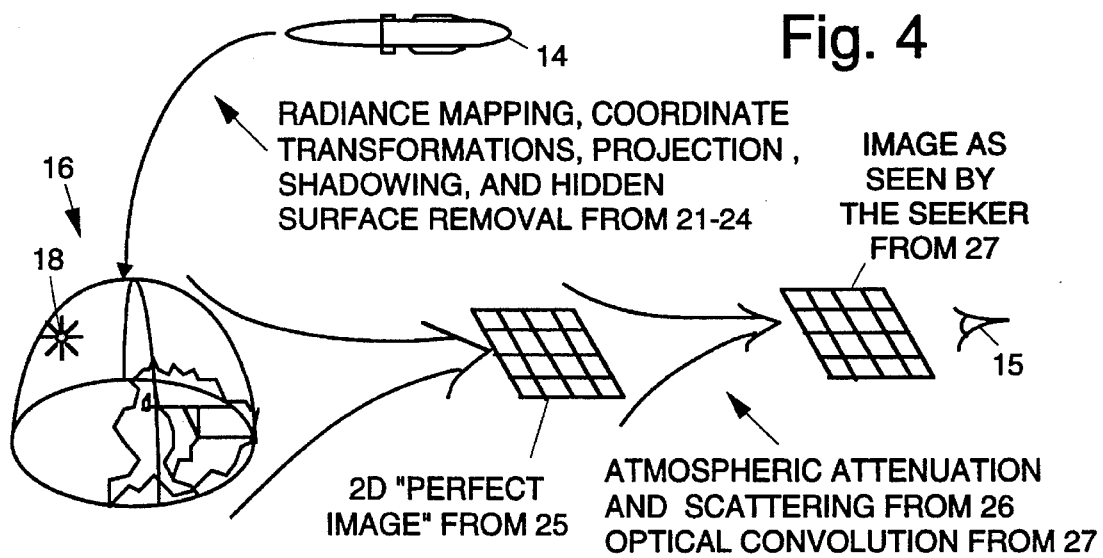

Fig. 4

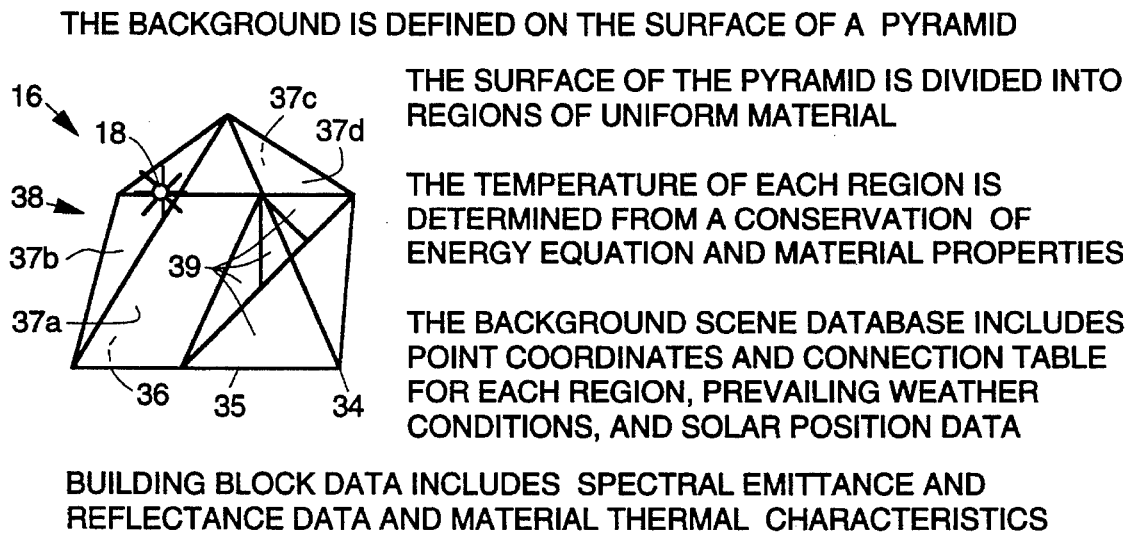

THE BACKGROUND IS DEFINED ON THE SURFACE OF A PYRAMID

THE SURFACE OF THE PYRAMID IS DIVIDED INTO REGIONS OF UNIFORM MATERIAL

THE TEMPERATURE OF EACH REGION IS DETERMINED FROM A CONSERVATION OF ENERGY EQUATION AND MATERIAL PROPERTIES

THE BACKGROUND SCENE DATABASE INCLUDES POINT COORDINATES AND CONNECTION TABLE FOR EACH REGION, PREVAILING WEATHER CONDITIONS, AND SOLAR POSITION DATA

BUILDING BLOCK DATA INCLUDES SPECTRAL EMITTANCE AND REFLECTANCE DATA AND MATERIAL THERMAL CHARACTERISTICS

Fig. 5

TARGET SURFACE IS MODELED USING SMALL PLANAR FACETS

DATABASE INCLUDES FACET LOCATIONS, FACET NORMAL, AND FACET THERMAL CHARACTERISTICS AND SPECTRAL EMISSIVITY AND REFLECTIVITY

TARGETS HAVE FULL 6 DEGREE OF FREEDOM MOTION CAPABILITY

AIR TARGET MODELS INCLUDE PLUME RADIANCE MODEL

Fig. 6

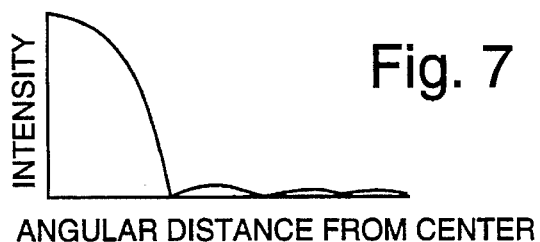

Fig. 7

INTENSITY vs ANGULAR DISTANCE FROM CENTER

COUNTERMEASURE MODEL IS FOR A FREE FALLING FLARE

DATA BASE IS COMPRISED OF:
  BURN PROFILE VS TIME
  BURN TEMPERATURE
  SIZE PARAMETERS FOR AERO DRAG DURING FALL
  EXTENDED BLUR PATTERN FOR SUPERPOSITION INTO IMAGE
  INITIAL POSITION AND VELOCITY RELATIVE TO TARGET

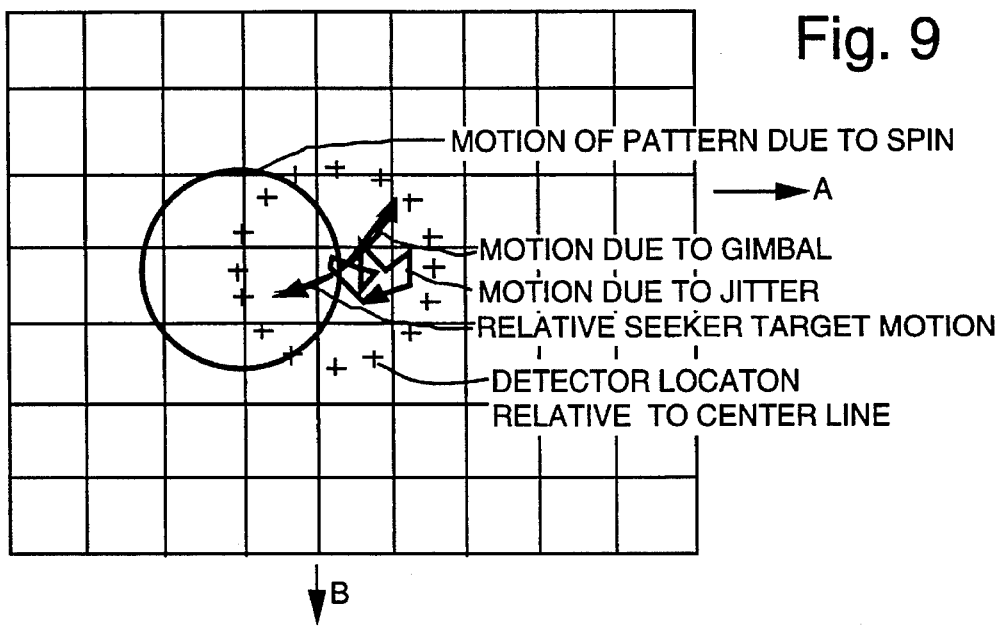

Fig. 9

- MOTION OF PATTERN DUE TO SPIN
- MOTION DUE TO GIMBAL
- MOTION DUE TO JITTER
- RELATIVE SEEKER TARGET MOTION
- DETECTOR LOCATON RELATIVE TO CENTER LINE

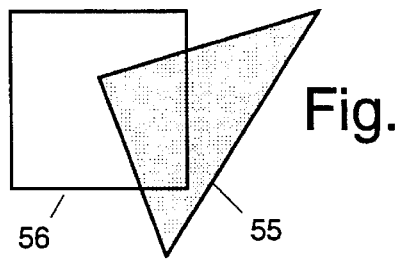

Fig. 10a

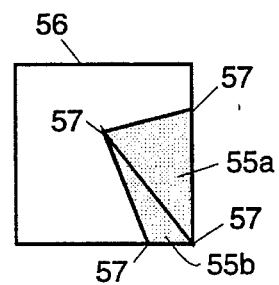

Fig. 10b

ELECTRO-OPTICAL TARGET AND BACKGROUND SIMULATION

BACKGROUND

The present invention relates generally to computer-implemented simulation systems and methods, and more particularly, to a computer-implemented electro-optical target and background simulation system and method that generates simulated images that may be used in designing and testing missile tracking systems.

Synthetic image generation from computer models has long been recognized as a convenient way for simulating a dynamic sensor/tracker system. It is particularly true when developing a high fidelity simulation to facilitate the design and test of a high performance tactical missile system. However, the requirement of high fidelity imagery from the models inevitably requires enormous computing resources. Recent advances in computer technology and associated decreasing computer cost have made this approach possible.

Methods of presenting targets in realistic backgrounds with range closure are needed for the accurate evaluation of electro-optic and multispectral (electro-optic and radio frequency) seekers designed to autonomously acquire a target and reject background or false targets. Heretofore, the ability of a seeker to acquire a target and reject background and countermeasures can only be demonstrated by expensive field tests, including captive flights, in a limited number of settings. Furthermore, high resolution seekers are sensitive to various portions of the target. Therefore, an accurate evaluation of the total seeker-missile concept cannot be realized early in the design stage of a seeker development program.

The development of a flexible simulation capable of simultaneously generating the electro-optic images in real time would allow a designer to test and refine parameters for proposed seekers and trackers early in the design stage. Such a simulator must be capable of interfacing to seeker simulations running in scaled time as well as breadboarded seeker hardware running in real time.

Subcomponent models for such a simulator fall into two categories. The first set of models are those executed once per simulation run. These models include target and background geometric and thermal properties models. For the background, these models include environmental models of how each material in the scene interacts with the environment, i.e., how thermal energy is gained and lost by each material, energy gain required for a one degree temperature change for each material, and energy radiated by a material as a function of temperature and wavelength. For targets, one must model internal heat sources, such as engines and their exhaust, and surface heating resulting from target motion.

The second category of model components are those that model the dynamics of target motion and generate the electro-optic information for each time step of the simulation. These algorithms are routinely computationally intensive requiring millions of floating point calculations for each simulated image. To achieve real time performance requires designing more efficient algorithms than currently exist and running those algorithms on fast special purpose computer hardware using advanced concurrent processing techniques.

Accordingly, it is an objective of the present invention to provide for a computer-implemented electro-optical target and background simulation method that generates simulated images that may be used in designing and testing missile tracking systems. It is a further objective of the present invention to provide for a real time multispectral target and background scene generator that is capable of generating images in the infrared, visible, and ultraviolet spectral regions of complex air or ground targets in realistic man-made and/or natural backgrounds and countermeasures for a staring detector array that may be employed by a missile seeker.

SUMMARY OF THE INVENTION

In order to provide for the above and other objectives, the present invention is a computer-based thermal scene simulation system and method for generating synthetic images used to facilitate the design and test of missile-borne electro-optical seeker systems. A scene is comprised of objects and a background selected from available target and background database files. Stationary or mobile objects are modeled by combining small planar facets to cover their three dimensional surface. Each facet is associated in the database files with the thermal and optical properties of the surface that is modeled. The background is modeled on the interior surface of a pyramid defining the extent of the scene, with the floor of the pyramid representing the surface of the earth and the sides of the pyramid representing an above horizon image. The pyramid surface is then divided into triangular facets that represent portions of the surface. Each facet is assigned a uniform texture selected from the background database files comprising background materials. The simulation is designed to be used with missile six degree of freedom simulations, and generates images as seen by a missile seeker based on instantaneous seeker line of sight, seeker position, seeker orientation, object orientations and positions, and background. Seeker-to-object aspect angles and range closure rates are processed by an image generation procedure. A projected image is then convolved with the optical point spread function of the seeker to generate a radiance distribution on the focal plane of the seeker. Sampling of the focal plane radiance distribution is modeled and an output data stream from the seeker to a signal processor is generated.

More specifically, the present invention is an electro-optical target and background simulation system for generating synthetic images that facilitate the design and test of a missile-borne electro-optical seeker system. The system comprises a background database from which a simulated background is generated and which comprises data defining an image scene that comprises a pyramid whose boundary specifies the extent of the image scene, and wherein the pyramid is divided into a pyramid base defining a below horizon background surface and pyramid sides defining an above horizon background surface, and wherein each surface comprises triangular regions of uniform texture, and a target database comprising a plurality of triangular object facets representative of simulated objects that overlay the background generated from the background database. Processing means are coupled to the background and target data-bases for processing data derived therefrom and for generating the synthetic images.

The processing means comprises a plurality of signal processing procedures including a radiance mapping procedure for providing a surface radiance map of the image scene; a coordinate transformation procedure for processing data indicative of target and missile center-of-mass positions and orientations and for providing a three dimensional seeker image frame; a shadowing procedure for determining shadowed areas on an object; a hidden surface removal procedure that removes object facets that are obscured from the view of the seeker; a perspective projection procedure for generating a two dimensional image plane by perspective three dimensional mapping from the background and target databases to a focal plane of the seeker; an atmospheric attenuation and scattering procedure for processing range and weather condition data to determine the atmospheric effect on the radiant intensity of the background and target and to modify the image in response thereto; and an optical convolution procedure for providing a two dimensional image on the focal plane of the seeker by convolving the projected image with an optical point spread function of the seeker to generate a radiance distribution on the focal plane of the seeker, which radiance distribution comprises the synthetic image.

The present invention also contemplates an electro-optical target and background simulation method for generating the synthetic images. The present method comprises the steps implemented in the processing means and operates on data in each of the databases.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 schematically illustrates image generation in accordance with the principles of the present invention;

FIG. 5 illustrates the structure of the background database employed in the system and method of FIG. 1;

FIG. 6 illustrates the structure of the target database employed in the system and method of FIG. 1;

FIG. 7 illustrates the countermeasures database employed in the system and method of FIG. 1;

FIG. 9 illustrates detector position in an image and the effects of various motion parameters on the simulated detector employed in the system and method of FIG. 1;

FIG. 10a shows a background triangle partially contained in the field of view; and FIG. 10b shows new triangles formed from a visible region of the background triangle of FIG. 10a.

DETAILED DESCRIPTION

Figure 1:
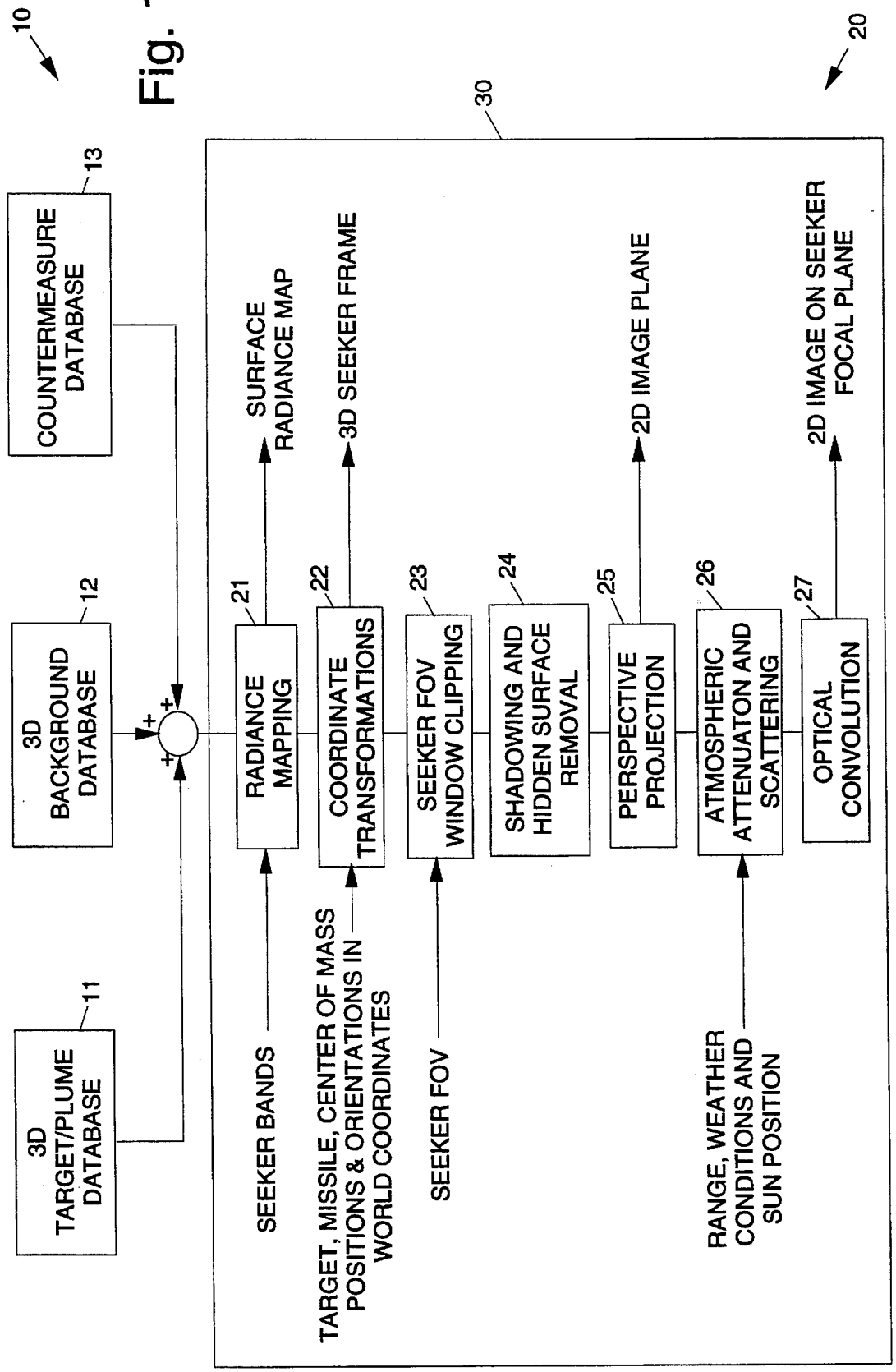
FIG. 1 is a block diagram illustrating an architecture of a computer-implemented electro-optical target and background simulation system employing a simulation method in accordance with the principles of the present invention.

Referring to the drawing figures, FIG. 1 is a block diagram illustrating an architecture of a computer implemented electro-optical target and background simulation (TABS) system 10 employing a simulation method 20 in accordance with the principles of the present invention. More specifically, a functional overview of the simulation method 10 is shown in FIG. 1. A modular approach is employed in the simulation method 10 so that future modifications and enhancements may be easily made.

The simulation method 10 is employed with a three dimensional target/plume database 11, a three dimensional background database 12, a countermeasures database 13, and is comprised of an image generator 30 which implements an image generation method 20 (procedure 20 or algorithm 20) that accesses each of the databases 11, 12, 13 as required and is adapted to generate synthetic images that facilitate the design and test of a missile-borne electro-optical seeker system. The image generation procedure 20 implemented in the image generator 30 comprises: a radiance mapping procedure 21 that is adapted to determine the radiance of each target facet that forms the target, plume point radiance, mean radiance values for background regions, sun position, and atmospheric conditions; a coordinate transformation procedure 22; a seeker field of view window clipping procedure 23; a shadowing and hidden surface removal procedure 24; a prospective projection procedure 25; an atmospheric attenuation and scattering procedure 26; and an optical convolution procedure 27.

A plurality of inputs are provided to the simulation procedure 20 including: seeker operating frequency bands that are used by the radiance mapping procedure 21, target and missile center-of-mass positions and orientations in world coordinates that are used by the coordinate transformation procedure 22, seeker field of view data that is used by the window clipping procedure 23, and range, weather conditions and sun position data which is used by the atmospheric attenuation and scattering procedure 26. A plurality of outputs are generated by the simulation procedure 20 including: a surface radiance map from the radiance mapping procedure 21, a three dimensional seeker frame provided by the coordinate transformation procedure 22, a two dimensional image plane provided by the perspective projection procedure 25, and a two dimensional image on a seeker focal plane provided by the optical convolution procedure 27.

Figure 2:
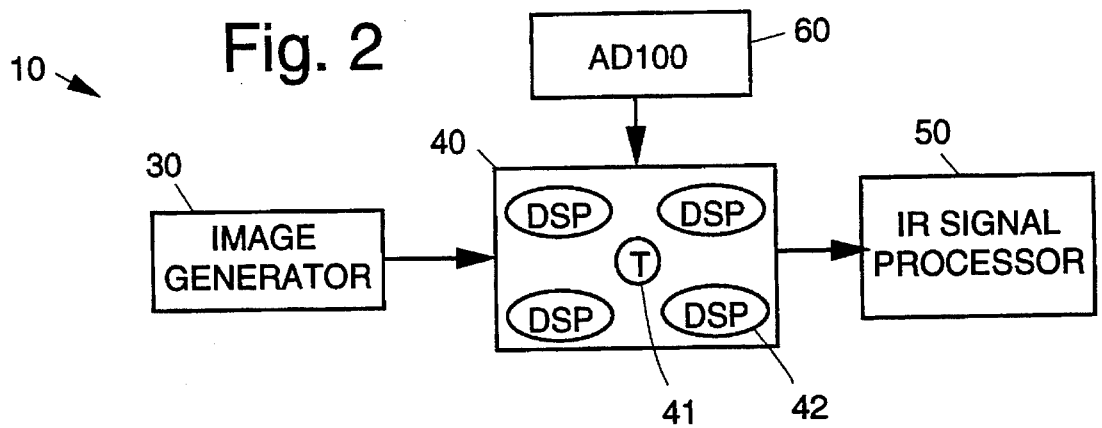
FIG. 2 shows a hardware block diagram of the system of FIG. 1.

FIG. 2 shows a hardware block diagram of the system 10 of FIG. 1. The system 10 is comprised of the image generator 30, a scan generator 40, an IR signal processor 50 and a missile kinematics simulation 60, for example. The scan generator 40 is comprised of an INMOS transputer (T) 41 that interfaces with the missile kinematics simulation 60, the IR signal processor 50, and the image generator 30, and four digital signal processor 42 (DSP) such as AT&T model DSP32C processors arranged in a pipeline architecture as illustrated. The memory requirements for the scan generator hardware total approximately 220 Kbytes. To meet real time constraints, the functions of the image generator 30 are performed using an array of 16 AT&T DSP32C DSP processors 42 and the scan generator 40 runs on an array of 4 AT&T DSP32C DSP processors 42.

Figure 3:
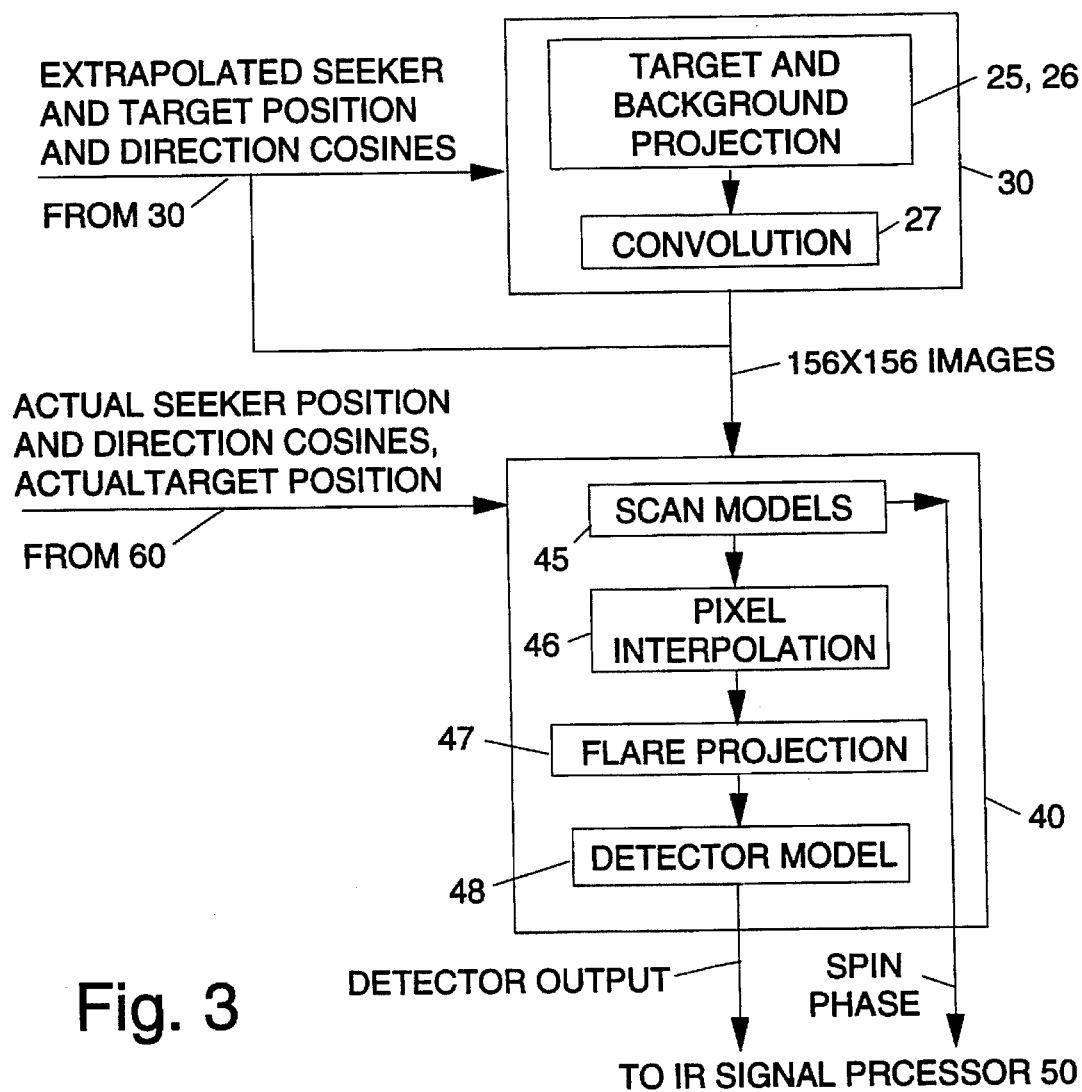
FIG. 3 shows a flow diagram for the IR image generation and scan generation performed by the system and method of the present invention.

Referring to FIG. 3, it shows flow diagram for the IR image generator 30 and scan generator 40 of the system 10 and method 20. The real time implementation of the image generator 30 that implements the present method 20 is divided into three basic segments: background radiance projection 25, target radiance projection 26, and optic blur convolution 27. The scan generator 40 is comprised of four basic functions: determination of individual detector positions in the image (scan models 45), pixel interpolation 46, flare radiance projection 47, and a detector electronics model 48. For efficient use of computing resources, these functions are separated and interwoven as illustrated in FIG. 3. The IR image generator 30 processes extrapolated seeker and target position and direction cosine data derived from the missile kinematics simulation 60. The scan generator 40 processes actual seeker position and direction cosine data and actual target position data derived from the derived missile kinematics simulation 60. Output data from the scan generator 40, including detector output data and spin phase, is optionally coupled to the signal processor 50 for processing.

FIG. 4 schematically illustrates image generation in accordance with the principles of the present invention. A missile 14 containing a seeker 15 is flown towards a simulated target 14 or location on the surface of the earth. The present system 10 and method 20 is adapted to generate an image scene 16 that the seeker 15 "sees" as the missile 14 flies its flight path toward the target 14.

The target, background, and countermeasures databases 11–13 (FIG. 1) are predefined and stored on a hard or optical disk (not shown). Each database 11, 12, 13 is comprised of geometric, thermal, and optical properties that characterize the object or material that is modeled. The structure of the databases 11–13 will be described with reference to FIG. 5. FIG. 5 illustrates the structure of an image scene 16 created from the background database 11, for example, employed in the simulation system 10 and method 20 of FIG. 1, and which is typical of each of the databases 11–13. The image scene 16 is comprised of background 32 and objects 33. The background 32 is defined on a surface of a pyramid 34 whose boundary specifies the extent of the image scene 16. The pyramid 34 logically divides into two sections, namely, a pyramid base 35 defining a below horizon background surface 36, and pyramid sides 37a–37d defining an above horizon background surface 38. Each surface of the pyramid 34 is divided into triangular regions 39 of uniform material textures selected from those available in the background database 12. Boundary lines of each region 39 are stored in an ordered lookup table to minimize region search time in the perspective projection procedure 25. Each region is assigned to a material type from those available in the database 11. The modeled textures include, but are not limited to, growing fields, dirt roads, plowed fields, tall grass both growing and dormant, short grass both growing and dormant, sand, water bodies, ice, paved surfaces, clouds on the horizon, mountains on the horizon, and clear sky. The boundaries of the various background regions 39 are defined by straight line segments traversed in a clockwise manner. The background database 12 also includes prevailing weather conditions and solar position data. This allows an unlimited number of different scenes 16 to be quickly assembled from data in the background database 11.

Radiance mapping provided by the radiance mapping procedure 21 assigns intensity values to the components of the image scene 16. The background, target, and countermeasures databases 11–13 are mapped into the image scene 16 in a manner defined by a user. The position of the targets 14, missile seeker 15, countermeasures and the sun 18 are also defined with respect to an inertial coordinate system centered on the floor of the pyramid 34. The background, target and countermeasure databases 11–13 contain the information concerning the radiance and spatial characteristics of the image scene 16, as is illustrated in FIGS. 5, 6, and 7.

Figure 6A:
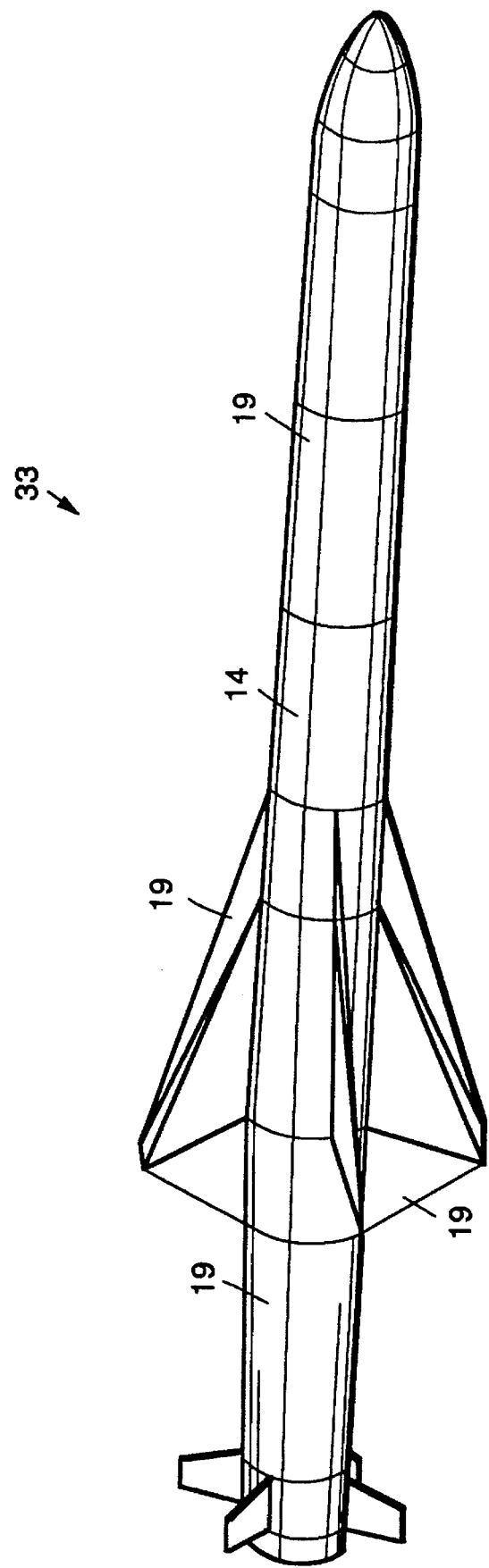
FIG. 6a shows details of a typical target (object) derived from the target database of FIG. 1.

Referring to FIG. 6, objects 33 are defined to be those things in the image scene 16 that may obscure the view or illumination of something else. Objects 33 are classified as to their mobility and type. Mobile objects 33 are manmade objects such as tanks, trucks, and aircraft, and natural objects such as clouds. Immobile objects 33 are manmade objects such a buildings, dams, and roads, and natural objects such as trees, rocks, and hills. More specifically, and with reference to FIG. 6a, it shows the details of a typical target 14 (object 33) derived from the target database 11. The target 14 in FIG. 6a represents a wire frame model of an Exocet missile after hidden surface removal in accordance with the present invention. The database for each object 33 is comprised of a set of small planar facets 19 (shown in FIG. 6a) defined by points on the surface of the object 33 or target 14 and the normal to the surface at that location. The facets 19 are similar to the pyramid sides 37a–37d. Each facet 19 represents a given surface area of uniform radiance. Each facet 19 is assigned optical properties corresponding to those of the area represented. The properties in the database 11 include reflectivity, emissivity, and transparency as functions of wavelength, temperature, specific heat, and subsurface temperature. With this information, the emitted and reflected radiation in a frequency band of interest is calculated. The initial position and orientation of each object is read in as part of the database 11 at execution time. For mobile objects 32, their position and orientation are updated at each time step of the simulation. The mobile objects 32 have three rotational and three translational degrees of freedom for motion relative to the world coordinate system. In addition aircraft models also have a gaseous plume model designed to emulate the spectral and spatial distribution of emitted plume radiation. Objects 32 in the database 11 include, but are not limited to, a MIG-21 fighter aircraft, a MIG-27 fighter aircraft, a T-62 battle tank, an Exocet air-to-surface missile (shown in FIG. 6a), and a generic ICB M.

Referring to FIG. 7, the countermeasure model used in the countermeasures database 13 is that of a free-falling pyrotechnic flare. This database 13 is comprised of burn profile versus time, burn temperature, size parameters for aerodynamic drag during fall, extended blur pattern for superposition onto the image, and its initial position and velocity relative to a target 14. The flare radiance is derived from theoretical calculation based upon flare temperature.

The present simulation system 10 method 20 was developed to create a background and target intensity map for applications in the analysis and design of missile seekers 15. Referring again to FIG. 4, it illustrates the overall image generation process provided by the present invention. The system 10 method 20 uses various types of backgrounds that are mapped onto a pyramid in positions defined by the user. The background or target 14 is a source of energy in the IR spectrum. The intensity of a source is determined by its temperature and emissivity. Presented below are the equations used to verify the image generation code employed in the present system 10 and method 20.

At execution time of the image generation procedure 20, the target 14 is caused to fly according to a predefined flight trajectory in a selected background while the missile seeker 15 starts to search and track after the missile/seeker 15 is launched. The relative seeker 15 to target 14 geometry is thus established and is used as a reference for relevant coordinate transformations 22. Characteristics of the seeker 15 such as frequency bands, aperture, and the point spread function are used to generate the image of the background 32, target 14 and flares (countermeasures) as seen by the seeker 15. The images 16 are then presented dynamically to the seeker 15 as seeker line-of-sight and positions change with time.

The electro-optical image generation procedure 20, illustrated in FIG. 4, creates the image by projecting data comprising the image scene 16 onto an image plane of the seeker 15 and then texturing the pixels covered by each region and object appropriately. The generated image is centered on a center line of the field of view of the seeker 15. The image generation procedure 20 starts with a picture array having an angular resolution at least three times better than the detector resolution centered on a central ray of the seeker 15. The scene data is then transformed into the seeker frame and projected onto this array starting with the background and working from the farthest object to the closest object in the scene. Each subpixel or array element is assumed to be completely filled by the last object projected onto that subpixel. The image generation procedure 20 is divided into seven operations or procedures 21–27 shown in FIG. 1. These procedures 21–27 take the information contained in the three databases 11–13 and produces the image that is seen by the seeker 15.

The radiance mapping procedure 21 assigns intensity values to components of the image scene 16 based on parameters in the databases 11–13. The radiance from a source is dependent on temperature and illumination. For the background, the conservation of energy equation used for determining background temperature is:

$$T = \int_{t0}^{t1} R_I(\lambda)[E_S(\tau) + E_{SUB}(\tau) + E_A(\tau) + E_C(\tau)]dt$$

where t0 is time at sunrise, t1 is the simulation time of day integrated over time $\tau$, $C_{sp}$ is the specific heat of the material, $Es(\tau)$ is the energy on the surface due to the sun 18 or solar loading, $E_{SUB}(\tau)$ is the convective energy loss or gain to the region below the surface, $E_A(\tau)$ is the radiative loss or gain due to the atmosphere, $E_c(\tau)$ is the energy loss or gain due to the convection currents to the atmosphere. Once the temperature is known, the radiance in a band ($R_e$) can be found by integrating Planck's equation:

$$R_E = \int_{t0}^{t1} \frac{8hc}{\lambda^5} \frac{e(\lambda)}{(e^{-hc/\lambda kT} - 1)} d\lambda$$

where $\epsilon(\lambda)$ is the emissivity of a material for a given wavelength $\lambda$, h is Planck's constant, c is the speed of light, and k is Boltzman's constant. Once the radiance values are calculated they are loaded into the database 11 along with the spatial information. When available, calibrated imagery data may also be used for the radiation and texture of the background region.

For objects, each facet 19 in an object represents a given surface area of uniform radiance. Each facet 19 is assigned optical properties corresponding to those of the area represented. The properties in the database 11 include reflectivity, emissivity, and transparency as functions of wavelength, temperature, specific heat, and subsurface temperature. With this information the emitted and reflected radiation in the band of interest is calculated. The facet temperature T of the target 14 is given by:

$$T = T_\infty \left[ 1 + \frac{R(\gamma - 1)M^2}{2} \right]$$

where $T_{28}$, is the ambient air temperature, R is the recovery factor (between 0.9 and 1.0), y is the ratio of specific heats for the atmosphere, and M is the speed (Mach number) of the target 14.

The reflected power from the facets is calculated using the following equations for diffuse and specular reflection:

$$R_D(\theta_I) = \int_{\lambda 0}^{\lambda 1} R_D(\lambda) \cos\theta_I \rho_D(\lambda) d\lambda$$

$$R_S(\theta_S, \theta_I) = \int_{\lambda 0}^{\lambda 1} R_I(\lambda) 0.5 \left( \cos\left(\frac{\pi\theta_S}{\theta_M}\right) + 1 \right) \cos\theta_I \rho_S(\lambda) d\lambda$$

for $|\theta_S| < \theta_M$, 0 otherwise where $R_D$ is for the diffusely reflected power and $R_S$ is for the specularly reflected power. Diffuse reflections are assumed to be Lambertian in nature for this simulation. Specular reflections are mirror-like in nature spread over a small angle around the geometric specular reflection angle. In these equations $\theta_I$ is the angle between the incident radiation and the surface normal, $\theta_s$ is the angle between the specular reflection ray and the look vector, $\theta_m$ is the maximum angle at which the specular reflection is seen, $R_I(\lambda)$ is the radiance incident on the surface at a wavelength, and $\rho_D(\lambda)$ and $\rho_s(\lambda)$ are the defuse and specular reflectivity coefficients. The total radiance from each facet 19 is then given by:

$$R(\theta_I, \theta_S) = R_E + R_D(\theta_I) + R_S(\theta_I, \theta_S).$$

The plume is treated as regions of uniform temperature, chemical composition and pressure. For each region and each molecular species in that region the radiance, $R_I$, is found by calculating;

$$R_i = \sum_i \rho_i \gamma_{vi} \frac{e^{-\mu/bkT}}{(1 - e^{-hv_{ij}/bkT})(1 - e^{-\alpha_{i,j}t})} hv_{ij}$$

where $\rho_i$ is the density of species i, $\zeta_{v,i}$ is the vibrational degeneracy of the state, $\mu$ is the chemical potential for the gas, h is the Planck's constant, $v_i$ is the vibration frequency for the $i^{th}$ vibrational state, $\alpha_{vj}$ is the decay rate for the state by photon emission, and $\tau$ is the period of observation. The calculated intensity is added to the background.

The countermeasures used in the system 10 and method 20 are flares. Flare radiance is determined by integrating Planck's equation for the flare temperature. The flare is then treated as a uniform sphere of fixed area radiating at this temperature. FIG. 7 shows the contents of the countermeasures database 13. Flares are intense sources designed to either match the target signature in some way or to blind or distract the seeker 15 long enough for the target 14 to maneuver away. They are similar to plumes in that they have regions of uniform temperature that decrease as the distance from the center increases.

All coordinate transforms using the coordination transformation procedure are performed using a matrix of the form:

$$T = \begin{pmatrix} dc_{11} & dc_{12} & dc_{13} & x_r \\ dc_{21} & dc_{22} & dc_{23} & y_r \\ dc_{31} & dc_{32} & dc_{33} & z_r \\ 0 & 0 & 0 & 1 \end{pmatrix}$$

where the $dc_{ij}$ are the direction cosines defining the relative orientation of the two coordinate systems, and $(x_r, y_r, z_r)$ is the vector defining the offset between the origins of the two systems.

Figure 8:
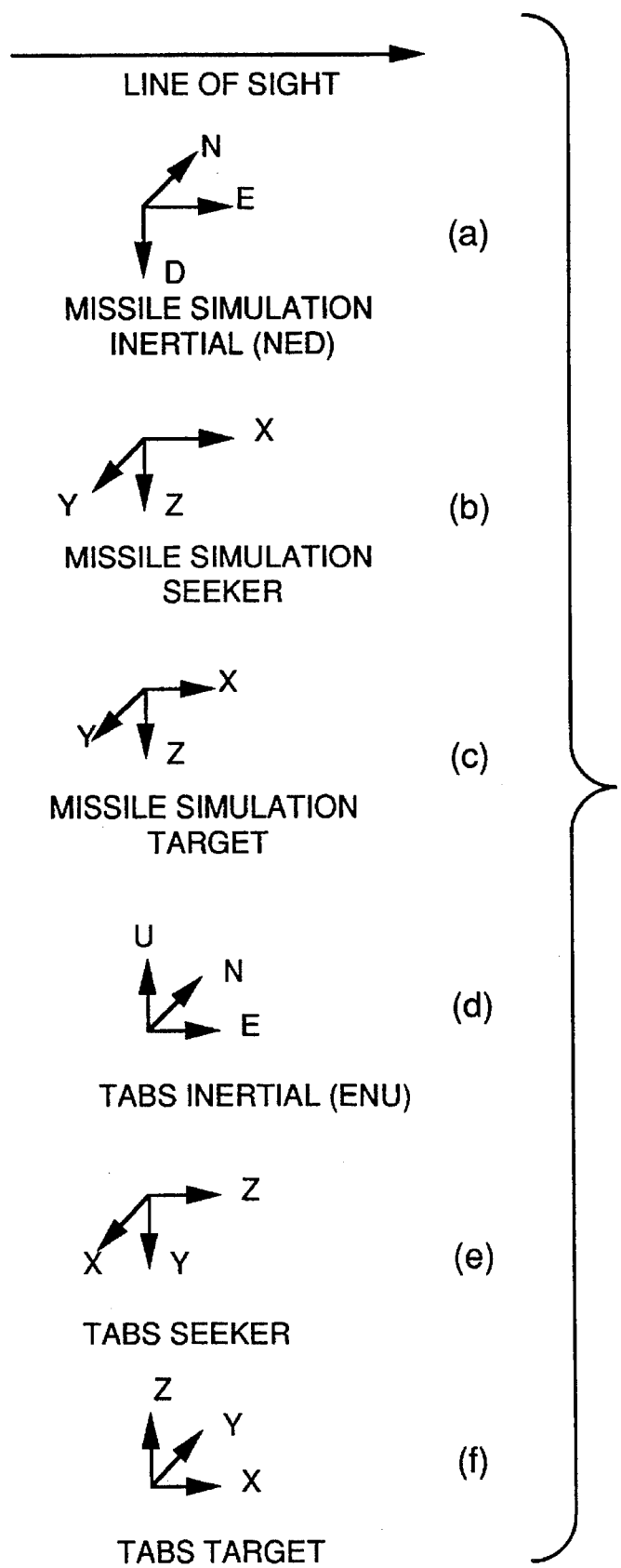
FIG. 8 illustrates coordinate systems employed in the system and method of FIG. 1.

For infrared simulations, there are six coordinate systems, and use generally well-known, conventional coordinate definitions. Coordinate system definitions are shown in FIG. 8, comprising FIGS. 8a–8f.

The fixed rotation from missile simulation inertial to the TABS inertial is given by:

$$\begin{pmatrix} x \\ y \\ z \end{pmatrix}_{TABS\,INERTIAL} = \begin{pmatrix} 0 & 1 & 0 \\ 1 & 0 & 0 \\ 0 & 0 & -1 \end{pmatrix}_{MI,TABSI} \begin{pmatrix} x \\ y \\ z \end{pmatrix}_{MI}$$

The fixed rotation from missile seeker 15 to the TABS seeker 15 is given by:

$$\begin{pmatrix} x \\ y \\ z \end{pmatrix}_{TABS\,SEEKER} = \begin{pmatrix} 0 & 1 & 0 \\ 0 & 0 & 1 \\ 1 & 0 & 0 \end{pmatrix}_{MS,TABSS} \begin{pmatrix} x \\ y \\ z \end{pmatrix}_{MS}$$

The fixed rotation from missile target 14 to the TABS target 14 is given by:

$$\begin{pmatrix} x \\ y \\ z \end{pmatrix}_{TABS\,TARGET} = \begin{pmatrix} 1 & 0 & 0 \\ 0 & -1 & 0 \\ 0 & 0 & 1 \end{pmatrix}_{MS,TABST} \begin{pmatrix} x \\ y \\ z \end{pmatrix}_{MT}.$$

The shadowing and hidden surface removal procedures 24 are logically very similar. Shadowing is the determination of the shadowed areas on an object due to the surface not being oriented toward the sun 18 or obscuration of sunlight that would hit the surface but is obscured by another portion of the same object. Hidden surface removal is the removal of object facets obscured from the view of a seeker 15 due to the surface not being oriented toward the seeker 15, or obscuration of line of sight from the seeker 15 that would hit the surface but is obscured by another portion of the same object. The shadowing and hidden surface removal procedure 24 is a two-stage procedure. The first stage computes the dot product between the facet normal and the vector to the sun or seeker 15. If the dot product is negative the facet is not oriented toward the sun 18 or seeker 15 and is thus flagged as shadowed or obscured. The second stage compares the facets with each other and determines if the line of sight from the sun 18 or seeker 15 to a facet 19 is obscured by another facet 19. If it is obscured the facet 19 is flagged as shadowed or obscured.

Prospective projection 25 is the mapping of the portion of a three dimensional scene 16 viewed by the seeker 15 into a pixel map of intensity values. The portion viewed by the seeker 15 is defined by the seeker field of view, the seeker position, and the line of sight of the seeker 15. The portion of the scene 16 viewed may or may not include the target 14. The projection procedure 25 assumes a small angle for the total field of view, which is generally less than 10 degrees. The position that a point in the scene 16 is projected to is given by:

$$x_f = \sin^{-1}(x/r) = \tan^{-1}(x/z) \cong x/z$$

$$y_f = \sin^{-1}(y/r) = \tan^{-1}(y/z) \cong y/z$$

where x, y, and z are point locations in the seeker frame in the TABS missile coordinate system. For background regions the region boundaries are projected on to the seeker image plane and, then filled using a raster scan procedure. For targets, the target facets 19 are projected onto the seeker image plane and assumed to fill the field of view of the pixel it is projected onto. With range closure the number of pixels a facet 19 fills is increased to account for the increased size of the facet 19.

Referring to FIGS. 10a and 10b, the background imaging routines include point coordinate transformation routines and background region projection routines, and the backgrounds are defined by triangles 55. Fewer instructions are needed to process triangles 55 than are needed, to process polygonal regions. In the present imaging method 20, the triangles 55 are processed one at a time. It is first determined if a triangle 55 or a portion of a triangle 55 is contained in the field of view 56 of the seeker 15. FIG. 10a illustrates a triangle 55 partially contained in the field of view. Once the border points 57 for the area of the background triangle 55 contained in the field of view 56 are identified, new triangles 55a, 55b are formed as shown in FIG. 10b. The pixels contained in each newly formed triangle 55a, 55b are assigned the radiance value associated with the original region. The reason for creating new triangles 55 is for speed. It is faster to create new triangles 55 and fill the pixels contained in them than to create one polygon and fill the pixels contained in it.

The plume imaging portion of the present system 10 and method 20 includes the coordinate transformation routines 22 and the perspective projection routines 25. The plume transformation and projection methods 22, 25 are based on a volume element model. In this model the plume is divided into equal sized volume elements. The center point of each volume element is transformed to the seeker frame using the target hardbody algorithm. After the transformation, the radiance value for each point is summed into the pixel it projects onto. The radiance value for each element is determined from the location of the volume element's center point in the plume, and the gas dynamics for that region of the plume. The plume volume elements are arranged within the plume so the points are uniformly distributed within the plume.

Atmospheric attenuation depends on wavelength, aerosols, temperature, time of day, and other factors. The conditions and environment are entered and the method 20 generates an extinction coefficient using the well-known LOWTRAN6 atmospheric model. The effect on the radiance is given by:

$$I = R_S e^{-\alpha r} + R_A(1 - e^{-\alpha r})$$
$$\cong R_S e^{-\alpha z} + R_A(1 - e^{-\alpha r})$$

where $R_S$ is the radiant intensity from the source, $R_A$ is the atmospheric radiant intensity, $\alpha$ is the attenuation coefficient, r is the range to the source, and z is the z component of the source position in the seeker frame.

Optical convolution 27 implemented in the present method 20 will now be described. The optics of a given seeker 15 are modeled using well-known software such as OSLO, CODE V, and ACOS V to determine its optical point spread function. The point spread function is then curve fit using a conventional cubic spline technique assuming circular symmetry in the point spread function. An optical blur kernel is calculated by integrating the point spread function of a point source centered at an angular offset of $\Delta a$, $\Delta b$ over the footprint of the detector. For this procedure the point spread function is assumed to be centered on a pixel and the $\Delta a$, $\Delta b$ are integer multiples of the pixel spacing. The optical blur kernel then represents the contribution to the energy incident on a detector centered, on a pixel from its neighboring pixels.

For very bright sources an extended blur pattern derived from diffraction theory and the aperture geometry is generated. The diffraction blur pattern is generally found by taking a two-dimensional Fourier transform using the aperture as the function to be transformed. The pattern is curve fit using the cubic spline function. This function is integrated over the detector footprint as above but extends to larger angular offsets. This kernel is used for modeling the intensity blur for flares and the sun 18.

The equation for convolving the image with the optic blur function employed in the convolution procedure 27 is:

$$I^c_{i,j} = \text{int}\left(\sum_{k=-n}^{} \sum_{l=-n}^{} k_{kl} \text{float}(I_{i-k,j-1})\right)$$

where $K_{k,l}$=optic transfer function

Scan generation 40 implemented in the present method will now be described. The location a given detector is viewing in the scene 16 at time t is given by:

$$(A,B)_D = T_R[(A,B)_{DO} + (A,B)_S] + (A,B)_J + (A,B)_G + (A,B)_{TS}$$

where $(A,B)_i$ is the detector offset in the image in radians due to:

DO—the fixed geometric offset of the detector from the center line of the seeker 15;
S—the spin phase;
J—jitter random noise in gimbal position;
G—gimbal motion relative to the position of the image;
$T_S$—the change in relative target-seeker position from that at which the image was generated; and
$T_R$—the rotation of the seeker head about the gimbal center line resulting from missile roll.

The effects of each of these motions is illustrated in FIG. 9. The detector location is updated at the image sample rate. The spin phase assumes a perfect motor and is therefore determined with a table lookup for each time step. At each time step the jitter position is determined using a Gaussian random number table with mean and standard deviation to be determined. The gimbal motion position, roll rotation matrix, and relative target-seeker motion position are determined from the actual seeker direction cosines, relative target-seeker position, the extrapolated seeker direction cosines, and target-seeker position for which the image was generated. The actual seeker direction cosines, seeker position in inertial coordinates, and target position in inertial coordinates are updated at a 1 millisecond rate. The seeker coordinate system used has the x axis along the seeker center line, the A axis is to the right when looking along the seeker axis and the B axis is down.

The gimbal motion is given by:

$$(X,A,B)_{GSx}^T = [DC]_{WSx}(X,Y,Z)_{GW}^T$$

where $(X,A,B)_{ASx}$ is the unit vector along the gimbal center line in the extrapolated frame, $[DC]_{WSx}$ is the direction cosine matrix to transform from the world system to the extrapolated seeker frame, and $(X,Y,Z)_{GW}^T$ is the unit vector along the gimbal center line in the world frame. $(X,Y,Z)_{GW}^T$ is the first row of the actual direction cosine matrix. This equation is executed once for each 1 millisecond position update.

The roll transformation matrix is determined by:

$$(X,A,B)_{ASx}^T = [DC]_{WSx}(X,Y,Z)_{GW}^T$$

where $(X,A,B)_{ASx}$ is the unit vector along the gimbal A axis in the extrapolated frame, and $(X,Y,Z)_{AW}^T$ is the unit vector along the gimbal A axis in the world frame. The term $(X,Y,Z)_{GW}^T$ is the second row of the direction cosine matrix. The A and B components of this vector are the cosine and sine of the roll angle. The roll rotation matrix is thus given by:

$$T_R = \begin{pmatrix} A_{ASx} & B_{ASx} \\ -B_{ASx} & A_{ASx} \end{pmatrix}.$$

These equations are executed once for each 1 millisecond position update.

Relative target-seeker motion will now be described. An offset caused by relative target-seeker motion is determined by transforming the actual relative target-seeker position to the extrapolated seeker frame using the equation:

$$(X,Y,Z)_{TSx} = [DC]_{WSx}(X,Y,Z)_{TSa}$$

where $(X,Y,Z)_{TSx}$ is the target position in the extrapolated seeker frame, and $(X,Y,Z)_{TSa}$ is the relative target-seeker position in the world frame. The projected extrapolated target position in the extrapolated seeker frame is given by:

$$(A,B)_{pxt} = (Y,Z)_{xt}/X_{xt}$$

where $(X,Y,Z)_{xt}$ is the extrapolated target position in the extrapolated seeker frame. This information is updated at a 40 millisecond rate. The projected target position is given by:

$$(A,B)_{pat} = (Y,Z)_{TSx}/X_{TSx}$$

The relative target-seeker motion offset is then given by:

$$(A,B)_{TS} = (A,B)_{pxt} - (A,B)_{pat}$$

and is updated at a 1 millisecond rate.

Conversion of image coordinates to image index will now be described. The coordinates calculated using the above equations are convened to pixel numbers by:

$$(I,J)_D = N^*(A,B)_D$$

where N is given by:

$$N = RN_O/R_O$$

and where $R_O$ is the range the image was generated at, $N_O$ is the number of pixels per radian at the range $R_O$, and R is the current range to the target 14. The ratio $N_O/R_O$ is computed once every image frame, and N is updated once every 1 millisecond. The array indices, $(I,J)_D$, are updated once every image sample for each detector.

Pixel interpolation will now be described. Given the pixel size and the spin rate of the detectors, a detector moves approximately ⅔ of a pixel between each sample. Therefore, approximately ⅓ of the time the detector samples the same pixel on two consecutive samples and occasionally, when crossing a pixel along the diagonal, on three consecutive samples. To improve the pulse shape approximation the pixels are linearly interpolated using the equation:

$$W = (1-a)^*(1-b)^*W(I,J) + a^*(1-b)^*W(I+1,J) + (1-a)^*b^*W(I,J+1) + a^*b^*W(I+1,J+1)$$

where the W(i,j) are the intensities of the i,j pixels, I and J are the integer indices of the pixel the detector fell in, and a and b are given by:

$$a = I'-I \text{ and } b = J'-J$$

where I' and J' are the floating point x and y coordinates of the detector location in the image.

Flare position and radiance projection will now be described. The flare position and intensity is updated in the image sample routine to allow for accurate modeling of the flare turn-on intensity and the flare target separation rate. The flare position in world coordinates is updated using the equations:

$$P_i = P_{io} + V_{io}\Delta t \text{ and}$$

$$V_i = V_{io} + dV_{io}n(V)_{\Delta t} + A\Delta t$$

where $P_{io}$, $V_{io}$, and A are the vectors for the previous position, velocity and acceleration for the $i^{th}$ flare, d is the coefficient of drag, n is the appropriate exponent for the velocity and $\Delta t$ is the time step. The system updates up to approximately 50 flares in the field for view at a time. A given flare's intensity is given by an intensity burn profile as a function of time stored in memory. The intensity incident on a given detector from a given flare is then given by:

$$\Phi_{i,D} = (A,B)_D(Y,Z)_i/X_i \text{ and } I = I_i(t)D(\Phi_{i,D})$$

where $I_i(t)$ is the flare intensity at time t, $\Phi_{i,D}$ is the angle between the flare position and the look vector for the detector, and $D(\Phi_{i,D})$ is the fraction of the flare intensity incident on the detector.

The detector noise is modeled as a filtered Gaussian distribution with a predetermined mean and standard deviation. The noise contribution for a given image sample is determined by a table lookup and summed with the voltage output for the detector. This operation is performed at the image sample rate. The sample and integrate function is modeled by summing the image samples for each detector. The sum of the image samples may then be used by the IR signal processor 50, if desired, which computes data that controls the maneuvering of the missile 14 on which the seeker 15 is located to guide the missile 13 to the target 14.

Thus there has been described a new and improved electro-optical target and background simulation system and method that generates simulated images that may be used in designing and testing missile tracking systems. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An electro-optical target and background simulation system for generating synthetic images, said system comprising:

a background database from which a simulated background is generated and which comprises data defining an image scene that comprises a pyramid whose boundary specifies the extent of the image scene, and wherein the pyramid is divided into a pyramid base defining a below horizon background surface and pyramid sides defining an above horizon background surface, and wherein each surface comprises triangular regions of uniform texture;

a target database comprising a plurality of triangular object facets representative of simulated objects that are adapted to overlay the background generated from the background database; and processing means coupled to the background and target databases for processing data derived therefrom and for generating the synthetic images, and wherein the processing means comprises:

radiance mapping means for providing a surface radiance map of the image scene;

coordinate transformation means for processing data indicative of target and missile center-of-mass positions and orientations and for providing a three dimensional seeker image frame;

shadowing means for determining shadowed areas on an object;

hidden surface removal means that removes object facets that are obscured from the view of the seeker;

perspective projection means for generating a two dimensional image plane by perspective three dimensional mapping from the background and target databases to a focal plane of the seeker; and optical convolution means for generating a two dimensional image on the focal plane of the seeker by convolving the projected image with an optical point spread function of the seeker to generate a radiance distribution on the focal plane of the seeker, which radiance distribution comprises the synthetic image.

2. The electro-optical target and background simulation system of claim 1 wherein said processing means further comprises atmospheric attenuation and scattering means for processing range and weather condition data to determine the atmospheric effect on the radiant intensity of the background and target, and for modifying the image in response thereto.

3. The electro-optical target and background simulation system of claim 2 which further comprises a countermeasures database comprising a countermeasure model representative of a free-falling pyrotechnic flare, and which comprises data indicative of burn profile versus time, burn temperature, size parameters for aerodynamic drag during fall, extended blur pattern for superposition onto the image, and initial position and velocity relative to a target, and wherein flare radiance is derived from a calculation based upon flare temperature, and wherein the processing means is additionally coupled to the countermeasures database for processing data derived therefrom to generate the synthetic images.

4. The electro-optical target and background simulation system of claim 2 wherein the processing means further comprises seeker field of view and window clipping means that processes seeker field of view data to limit the extent of the seeker field of view relative to the image scene.

5. The electro-optical target and background simulation system of claim 1 which further comprises a countermeasures database comprising a countermeasure model representative of a free-falling pyrotechnic flare, and which comprises data indicative of burn profile versus time, burn temperature, size parameters for aerodynamic drag during fall, extended blur pattern for superposition onto the image, and initial position and velocity relative to a target, and wherein flare radiance is derived from a calculation based upon flare temperature, and wherein the processing means is additionally coupled to the countermeasures database for processing data derived therefrom to generate the synthetic images.

6. The electro-optical target and background simulation system of claim 3 wherein the processing means further comprises seeker field of view and window clipping means that processes seeker field of view data to limit the extent of the seeker field of view relative to the image scene.

7. The electro-optical target and background simulation system of claim 1 wherein the processing means further comprises seeker field of view and window clipping means that processes seeker field of view data to limit the extent of the seeker field of view relative to the image scene.

8. An electro-optical target and background simulation system for generating synthetic images, said system comprising:

a background database from which a simulated background is generated and which comprises data defining an image scene that comprises a pyramid whose boundary specifies the extent of the image scene, and wherein the pyramid is divided into a pyramid base defining a below horizon background surface and pyramid sides defining an above horizon background surface, and wherein each surface comprises triangular regions of uniform texture;

a target database comprising a plurality of triangular object facets representative of simulated objects that are adapted to overlay the background generated from the background database; and processing means coupled to the background and target databases for processing data derived therefrom and for generating the synthetic images, and wherein the processing means comprises:

radiance mapping means for processing data indicative of seeker operating frequency bands and for determining the radiance of each target facet that forms the target, plume point radiance, mean radiance values for background regions, sun position, and atmospheric conditions, for providing an output comprising a surface radiance map of the image scene;

coordinate transformation means for processing data indicative of target and missile center-of-mass positions and orientations and for providing an output comprising a three dimensional seeker image frame shadowing means that determines shadowed areas on an object because the surface is not oriented toward the sun or because the surface is obscured by another portion of the same object, and that computes a dot product between a facet normal and a vector to the sun or seeker to determine if the facet is oriented toward the sun or seeker and hence is shadowed or obscured;

hidden surface removal means that removes object facets obscured from the view of the seeker because the surface is not oriented toward the seeker, or because the seeker is obscured by another portion of the same object, and that compares the facets with each other to determine if the facet is shadowed or obscured;

perspective projection means for generating a two dimensional image plane by perspective three dimensional mapping from the background and target databases to a focal plane of the seeker;

atmospheric attenuation and scattering means for processing atmospheric data to determine its effect on the radiant intensity of the background and target and for modifying the image in response thereto; and optical convolution means for generating a two dimensional image on the focal plane of the seeker by convolving a projected image with an optical point spread function of the seeker to generate a radiance distribution on the focal plane of the seeker, which radiance distribution comprises the synthetic image.

9. The electro-optical target and background simulation system of claim 8 which further comprises a countermeasures database comprising a countermeasure model representative of a free-falling pyrotechnic flare, and which comprises data indicative of bum profile versus time, bum temperature, size parameters for aerodynamic drag during fall, extended blur pattern for superposition onto the image, and initial position and velocity relative to a target, and wherein flare radiance is derived from a calculation based upon flare temperature, and wherein the processing means is additionally coupled to the countermeasures database for processing data derived therefrom to generate the synthetic images.

10. The electro-optical target and background simulation system of claim 8 wherein the processing means further comprises seeker field of view and window clipping means that processes seeker field of view data to limit the extent of the seeker field of view relative to the image scene.

11. The electro-optical target and background simulation system of claim 9 wherein the processing means further comprises seeker field of view and window clipping means that processes seeker field of view data to limit the extent of the seeker field of view relative to the image scene.

12. A computer-implemented electro-optical target and background simulation method for generating synthetic images, said method comprising the steps of:

generating a background database comprising data defining an image scene that comprises a pyramid whose boundary specifies the extent of the image scene, and wherein the pyramid is divided into a pyramid base defining a below horizon background surface and pyramid sides defining an above horizon background surface, and wherein each surface comprises triangular regions of uniform texture;

generating a target database comprising a plurality of triangular object facets representative of simulated objects that are adapted to overlay the background generated from the background database;

processing data derived from the background and target databases for generating the synthetic images that facilitate the design and test of an electro-optical seeker located on a missile, in accordance with the steps of:

processing data indicative of seeker operating frequency bands and for providing a surface radiance map of the image scene;

processing data indicative of target and missile center-of-mass positions and orientations in world coordinates and for providing a three dimensional seeker image frame;

processing seeker field of view data to clip the image to the extent of the seeker field of view;

determining shadowed or obscured areas on an object by computing a dot product between the facet normal and the vector to the seeker to determine if the object is shadowed or obscured;

removing object facets obscured from the view of a seeker due to shadowing or obscuration;

generating a two dimensional image plane by perspective three dimensional mapping from the scene database to a focal plane of the seeker;

generating a two dimensional image on the focal plane of the seeker by convolving the projected image with an optical point spread function of the seeker to generate a radiance distribution on the focal plane of the seeker, which radiance distribution comprises the synthetic image.

13. The simulation method of claim 12 further comprising the steps of:

generating a countermeasures database comprising a countermeasure model representative of a free-falling pyrotechnic flare, and which comprises data indicative of burn profile versus time, burn temperature, size parameters for aerodynamic drag during fall, extended blur pattern for superposition onto the image, and initial position and velocity relative to a target, and wherein flare radiance is derived from a calculation based upon flare temperature; and processing data derived from the background, target and countermeasures databases to generate the synthetic images.

14. The simulation method of claim 12 further comprising the step of processing atmospheric attenuation and scattering data to determine its effect on the radiant intensity of the image, and for modifying the image in response thereto.

* * * * *